United States Patent
Kim et al.

(10) Patent No.: US 10,649,714 B2
(45) Date of Patent: May 12, 2020

(54) DATA OUTPUT APPARATUS AND METHOD, AND COMPUTER-READABLE RECORDING MEDIUM

(71) Applicant: DOT INCORPORATION, Seoul (KR)

(72) Inventors: Ju Yoon Kim, Incheon (KR); Ji Ho Kim, Incheon (KR); Hyeon Cheol Park, Gwangmyeong-si (KR)

(73) Assignee: DOT INCORPORATION, Seoul (KR)

( * ) Notice: Subject to any disclaimer, the term of this patent is extended or adjusted under 35 U.S.C. 154(b) by 0 days.

(21) Appl. No.: 16/087,564

(22) PCT Filed: Mar. 24, 2017

(86) PCT No.: PCT/KR2017/003198
§ 371 (c)(1),
(2) Date: Sep. 21, 2018

(87) PCT Pub. No.: WO2017/164691
PCT Pub. Date: Sep. 28, 2017

(65) Prior Publication Data
US 2019/0107992 A1    Apr. 11, 2019

(30) Foreign Application Priority Data
Mar. 24, 2016  (KR) ........................ 10-2016-0035529

(51) Int. Cl.
*G06F 3/16* (2006.01)
*G06F 3/01* (2006.01)
(Continued)

(52) U.S. Cl.
CPC .................. *G06F 3/16* (2013.01); *G06F 3/01* (2013.01); *G06F 16/61* (2019.01); *G06F 16/68* (2019.01);
(Continued)

(58) Field of Classification Search
CPC .......... G06F 3/16; G06F 3/016; G06F 16/909; G06F 16/68; G06F 16/61; G06F 3/01; G10L 15/1815; G10L 25/63
See application file for complete search history.

(56) References Cited

U.S. PATENT DOCUMENTS 8,566,088 B2  10/2013 Pinson et al.
2011/0102160 A1*  5/2011 Heubel ................... G06F 3/011
340/407.1
(Continued)

FOREIGN PATENT DOCUMENTS

KR  10-2004-0032371 A  4/2004
KR  10-2009-0096803 A  9/2009
(Continued)

*Primary Examiner* — Fan S Tsang
*Assistant Examiner* — David Siegel
(74) *Attorney, Agent, or Firm* — Novick, Kim & Lee, PLLC; Sang Ho Lee (57) ABSTRACT

According to embodiments of the present disclosure, a data output method may include: receiving unit-time or unit-size auditory data which are generated around a user and detected via a first apparatus; removing noises from the auditory data; extracting a frequency component included in the auditory data from which the noises have been removed; measuring at least one frequency of the auditory data on the basis of the frequency component; searching a database on the basis of the at least one frequency to fine reference data oscillating at the at least one frequency; generating first output data providing semantic data included in the reference data; and generating and providing an output control signal for transmitting the first output data.

12 Claims, 8 Drawing Sheets

(51) Int. Cl.
*G06F 16/909* (2019.01)
*G10L 25/63* (2013.01)
*G06F 16/68* (2019.01)
*G06F 16/61* (2019.01)
*G10L 15/18* (2013.01)

(52) U.S. Cl.
CPC ........ *G06F 16/909* (2019.01); *G10L 15/1815* (2013.01); *G10L 25/63* (2013.01)

(56) References Cited

U.S. PATENT DOCUMENTS

2016/0027264 A1 1/2016 Choi et al.
2016/0210834 A1* 7/2016 Dayal .................... G08B 21/02

FOREIGN PATENT DOCUMENTS

| | | |
|---|---|---|
| KR | 10-2011-0095314 A | 8/2011 |
| KR | 10-1102405 B1 | 1/2012 |
| KR | 10-2015-0090950 A | 8/2015 |
| KR | 10-2016-0012704 A | 2/2016 |

* cited by examiner

DATA OUTPUT APPARATUS AND METHOD, AND COMPUTER-READABLE RECORDING MEDIUM

TECHNICAL FIELD

The present disclosure relates to a data output apparatus, a data output method, and a computer-readable recording medium, and more particularly, to a data output apparatus, a data output method, and a computer-readable recording medium that are for acoustically receiving information relating to a user and sensorially transmitting data corresponding to the information to the user.

BACKGROUND ART

Users are exposed to various sounds and voices every day. Sounds and voices are oscillating waves that are generated by sound sources and propagate away from the sources. If a user does not recognize or detect sounds or voices via his/her sense of hearing at the moment when the sounds or voices reach the user, the sounds or voices dissipate.

(Patent Document 1) Korean Patent Application Laid-open Publication No. 2004-0032371

DESCRIPTION OF EMBODIMENTS

Technical Problem

The present disclosure may provide a data output apparatus, a data output method, and a computer-readable recording medium for receiving data relating to a user and recognizable or detectable via the sense of hearing, and generating output data for transmitting data corresponding to the user-relevant data via another senses other than the sense of hearing.

Solution to Problem

According to embodiments of the present disclosure, a data output method may include: receiving unit-time or unit-size auditory data which are generated around a user and detected via a first apparatus; removing noises from the auditory data; extracting a frequency component included in the auditory data from which the noises have been removed; measuring at least one frequency of the auditory data on the basis of the frequency component; searching a database on the basis of the at least one frequency to fine reference data oscillating at the at least one frequency; generating first output data providing semantic data included in the reference data; and generating and providing an output control signal for transmitting the first output data.

Before the generating of the first output data, the data output method may further include comparing a first spectrum of the segmented auditory data with a second spectrum of the reference data to determine whether the first and second spectrums are similar to each other to an extent equal to or greater than a preset similarity degree, wherein only when the first and second spectrums are similar to each other to an extent equal to or greater than the preset similarity degree, the first output data providing the semantic data included in the reference data may be generated.

After the generating of the first output data, the method may further include generating second output data providing guide data linked to the reference data, and providing the output control signal after modifying the output control signal to additionally transmit the second output data.

The auditory data detected via the first apparatus may be data generated by at least one of an electronic device, a human, an object, and an animal around the user.

The semantic data may include a text included in the auditory data or at least one of emotions included in the auditory data.

The guide data may correspond to a follow-up reaction that the user makes when recognizing the auditory data.

The data output method may further include: receiving at least one piece of sensing data via a second apparatus different from the first apparatus; detecting an action included in the sensing data by analyzing the sensing data; and additionally generating third output data corresponding to the action.

In the detecting of the action, an action corresponding to a movement of an object moving or approaching at a velocity equal to or greater than a preset critical velocity may be detected from the sensing data, and in the additionally generating of the third output data, the third output data may be generated to generate a stimulation at a position corresponding to a position of the object, the stimulation having a magnitude corresponding to the velocity of the object.

According to embodiments of the present disclosure, a data output apparatus may include: a first reception unit configured to receive unit-time or unit-size auditory data which are generated around a user and detected by a first apparatus; a filter unit configured to remove noises from the auditory data; a measurement unit configured to extract a frequency component included in the auditory data from which the noises have been removed and measure at least one frequency of the auditory data on the basis of the frequency component; a search unit configured to search a database on the basis of the at least one frequency to find reference data oscillating at the at least one frequency; an output data generation unit configured to generate first output data providing semantic data included in the reference data; and an output unit configured to generate and provide an output control signal for transmitting the first output data.

The data output apparatus may further include a spectrum analysis unit configured to compare a first spectrum of the segmented auditory data with a second spectrum of the reference data to determine whether the first and second spectrums are similar to each other to an extent equal to or greater than a preset similarity degree, wherein only when the first and second spectrums are similar to each other to an extent equal to or greater than the preset similarity degree, the output data generation unit may generate the first output data providing the semantic data included in the reference data.

After the first output data is generated, the output unit may generate second output data providing guide data linked to the reference data, and may provide the output control signal after modifying the output control signal to additionally transmit the second output data.

According to embodiments of the present disclosure, a computer program may be stored in a medium to execute the data output method according to any of the embodiments of the present disclosure.

According to embodiments of the present disclosure, there is further provided a non-transitory computer readable recording medium storing a program for executing another method and system for implementing the present disclosure and the data output method.

Other aspects, features, and advantages will become apparent and more readily appreciated from the accompanying drawings, claims, and detailed description.

Advantageous Effects of Disclosure

According to embodiments of the present disclosure, data relating to a user and recognizable or detectable via the user's sense of hearing may be received, and data corresponding to the user-relevant data may be output.

BRIEF DESCRIPTION OF DRAWINGS

FIGS. 6 to 8B are views illustrating operations of the data output apparatus.

BEST MODE

The present disclosure may have diverse modified embodiments, and some embodiments are illustrated in the drawings and are described in the detailed description. Effects and features of the present disclosure, and implementation methods thereof will be clarified through the following embodiments described in detail with reference to the accompanying drawings. However, the present disclosure is not limited to the following embodiments but may be implemented in various forms.

Hereinafter, embodiments of the present disclosure will be described in detail with reference to the accompanying drawings. In the following description given with reference to the accompanying drawings, the same elements or corresponding elements are denoted with the same reference numerals, and overlapping descriptions thereof will be omitted.

In the following embodiments, it will be understood that although the terms "first," "second," etc. are used to describe various elements, these elements should not be limited by these terms. These terms are only used to distinguish one element from another.

In the following descriptions of the embodiments, the terms of a singular form may include plural forms unless referred to the contrary.

It will be further understood that the terms "comprises" and/or "comprising" used herein specify the presence of stated features or elements, but do not preclude the presence or addition of one or more other features or elements.

The order of processes explained in one embodiment may be changed in a modification of the embodiment or another embodiment. For example, two consecutively described processes may be performed substantially at the same time or performed in an order opposite to the described order.

In the following embodiments, for example, a circuit may include one or an arbitrary combination of a hardwired circuit storing instructions executable on a programmable circuit, a programmable circuit, a state machine circuit, and/or firmware. Applications may be implemented as codes or instructions executable on a host processor or another programmable circuit. As described in some embodiments of the present disclosure, a module may be implemented as a circuit. A circuit may be implemented as an integrated circuit such as an integrated circuit chip.

In the following embodiments, it will be further understood that the terms "comprises" and/or "comprising" specify the presence of stated features or elements, but do not preclude the presence or addition of one or more other features or elements. In the present disclosure, terms such as "unit," "~or/er," and "module" are used to denote a unit having at least one function or operation and implemented with hardware, software, or a combination of hardware and software.

Figure 1:
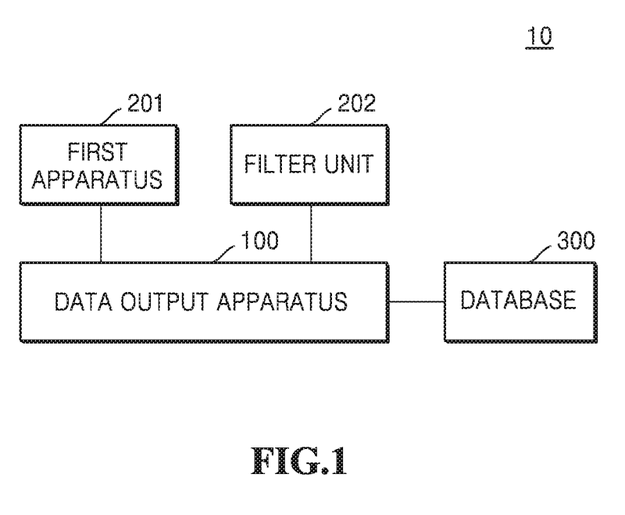
FIG. 1 is a view illustrating a data output system according to an embodiment of the present disclosure.

FIG. 1 is a view illustrating a data output system 10 according to an embodiment of the present disclosure.

Referring to FIG. 1, the data output system 10 according to the embodiment of the present disclosure may include a data output apparatus 100, a first apparatus 201, a second apparatus 202, and a database 300.

The data output apparatus 100 has a function of, by considering auditory data detected via the first apparatus 201, searching for semantic data corresponding to the auditory data or generating guide data corresponding to the auditory data, and generating output data including the semantic data and/or the guide data. The data output apparatus 100 may be implemented as an apparatus including the first apparatus 201. In addition, the data output apparatus 100 may detect a source generating auditory data and may sense or measure the movement of the source (position, velocity, movement path, or the like). The data output apparatus 100 may generate output data corresponding to a movement of the source.

In more detail, the data output apparatus 100 may detect auditory data generated by a surrounding electronic device, and if it is required to recognize the auditory data, the data output apparatus 100 may search for semantic data having meanings and including the auditory data. For example, the data output apparatus 100 may detect auditory data generated by a surrounding navigation device, a telephone, or a clock, analyze the auditory data or search for semantic data corresponding to the auditory data using previously stored reference data, and generate output data for transmitting the semantic data. In this case, the output data may of a type transmittable via the sense of sight, touch, smell, taste, or the like of a user except for the sensor of hearing of the user. The data output apparatus 100 may generate output data to provide information about a path to a destination received from an electronic device configured to provide directions, or to transmit auditory data providing notice on a traffic signal violation or a speed limit to a user. When the data output apparatus 100 detects auditory data such as ringtones or a door chimes from surrounding electronic devices, the data output apparatus 100 may generate output data for transmitting semantic data corresponding to the auditory data and may provide the output data to a user.

In addition, the data output apparatus 100 may detect a sound generated by another user, generate semantic data corresponding to the sound, and generate guide data with respect to the semantic data by analyzing the semantic data. Here, the semantic data may have a meaning corresponding to generated auditory data, and the guide data may contain information such as a behavior, a response, or a reaction of a user that has to follow the semantic data. In other words, for a user who is congenitally or situationally incapable of detecting a sound generated by another user, the data output apparatus 100 may generate output data for transmitting semantic data and/or guide data corresponding to the sound and may provide the output data to the user. Here, an action corresponding to a sound may be a text or a feeling included in the sound. For example, if the data output apparatus 100 detects a sound that is generated by another user and may be recognized as "Excuse me" requesting a response (reaction) from the other party, the data output apparatus 100 may detect "Excuse me" as semantic data, generate guide data about a behavior or response of a user such as "May I help you?" or "That's all right." corresponding to the semantic data, and generate output data including the semantic data and the guide data. When the data output apparatus 100 detects a crying sound of another user, particularly, an infant incapable of expressing any emotion, the data output apparatus 100 may generate semantic data, that is, an emotion contained in the crying sound, as output data. The semantic data contained in the crying sound may be one of "hunger," "sleepiness," "boring," "indigestion," "diaper wetting," and "desire to play."

Furthermore, in some selective embodiments, the data output apparatus 100 may collect various pieces of sensing data other than auditory data by means of the second apparatus 202, and may modify semantic data and/or guide data corresponding to auditory data by using the collected sensing data. In addition, the data output apparatus 100 may receive and collect various types of sensing data other that auditory data, detects actions included in the collected sensing data, and generate output data for transmitting the actions. The data output apparatus 100 may be implemented as an apparatus including the second apparatus 202.

The first apparatus 201 may be connected to the data output apparatus 100 by an electrical method or through a network, and may receive vibrations, sounds, or the like having various frequencies.

The second apparatus 202 may be connected to the data output apparatus 100 by an electrical method or through a network, may include at least one sensor configured to sense variations in a surrounding environment (temperature, humidity, gas, sound, or the like), and may acquire sensor values from the at least one sensor. The second apparatus 202 may include at least one of a temperature sensor, a pressure sensor, an optical sensor, an ultrasonic sensor, a proximity sensor, an acceleration sensor, and an image sensor.

The database 300 may receive auditory data from the data output apparatus 100 which a user wants to receive via his/her sense of sight, touch, taste, or smell, and the database 300 may recognize a voice included in the auditory data by performing a frequency analysis or a spectrum analysis on the auditory data and may extract a text corresponding to the voice. The database 300 may store the text corresponding to the auditory data as semantic data. In addition, the database 300 may extract emotions (semantic data) included in the auditory data and may store the emotions as semantic data. In addition, the database 300 may generate a description of a behavior, an action, or response that needs to be done next to the auditory data, as guide data, on the basis of the semantic data of the auditory data, and may store the guide data in relation to the auditory data. In particular, the database 300 may control auditory data, semantic data, and guide data to allow users to modify, change, or generate them, and may provide semantic data and guide data after searching for them in response to a request of the data output apparatus 100. The data output apparatus 100 may also generate semantic data and/or guide data by analyzing auditory data. The database 300 may set information about a source of auditory data to be about at least one of infants, humans, objects, electronic devices, and animals.

Figure 2:
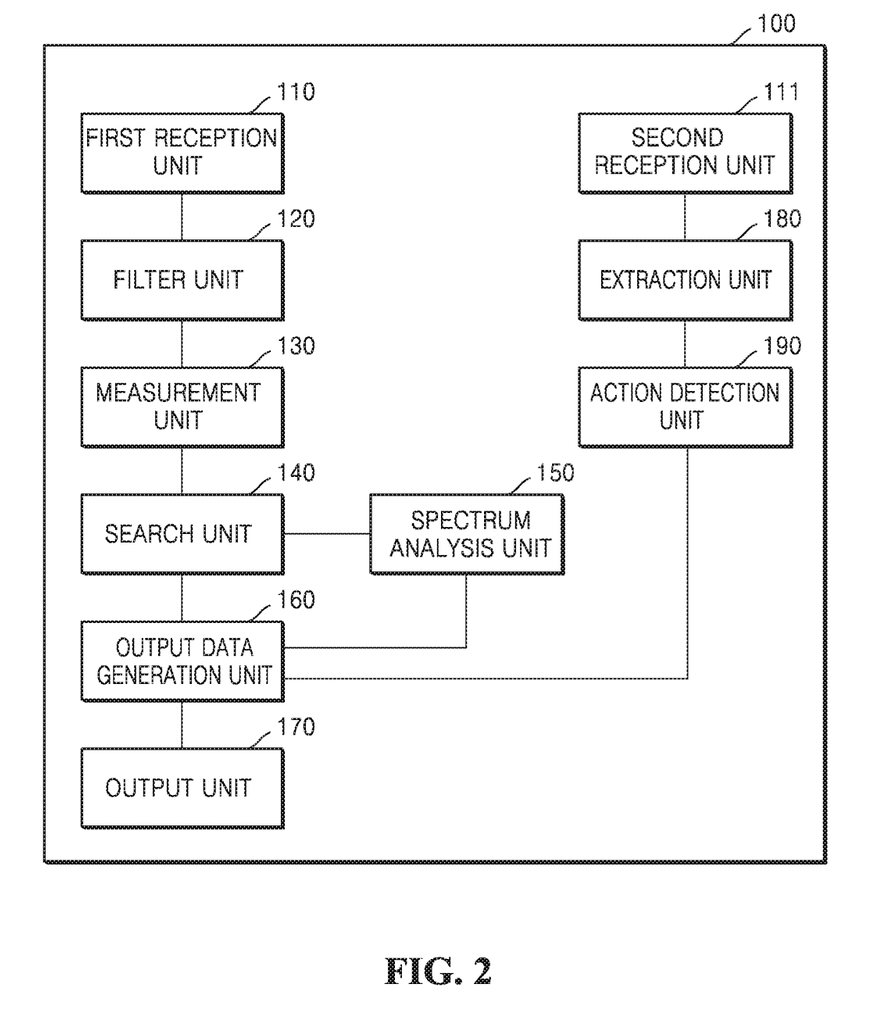
FIG. 2 is a block diagram illustrating a configuration of a data output apparatus according to embodiments of the present disclosure.

FIG. 2 is a block diagram illustrating a configuration of the data output apparatus 100 according to embodiments of the present disclosure.

Referring to FIG. 2, the data output apparatus 100 may include a first reception unit 110, a filter unit 120, a measurement unit 130, a search unit 140, a spectrum analysis unit 150, an output data generation unit 160, and an output unit 170.

The first reception unit 110 may receive auditory data, which is generated by a surrounding electronic device, an object, a human, an animal, or the like, from the first apparatus 201 including a microphone capable of acquiring auditory data. The first reception unit 110 may receive an amount of auditory data corresponding to a free space of a memory or a hard disk of the data output apparatus 100, or a unit size and/or a unit time preset by a user. Here, the unit size and/or unit time are required to a size and/or a time not causing a delay that a user may feel when a period of time necessary for generating output data to be transmitted to the user is considered.

The filter unit 120 removes noises from the auditory data. In more detail, after the filter unit 120 amplifies the auditory data, the filter unit 120 may determine a portion of the auditory data not included in a particular frequency band as noises and may remove the noises using a band-pass filter. In addition, the filter unit 120 may extract a section of the auditory data that may be recognized as a text. The filter unit 120 may remove noises from the auditory data or sensing data by various methods.

The measurement unit 130 may decompose a frequency component included in the auditory data after noises are removed from the auditory data as described above. The measurement unit 130 may measure at least one frequency included in the auditory data using the frequency component of the auditory data. The auditory data may have one frequency or a plurality of frequencies, and in general, sound has a plurality of frequencies.

According to other embodiments, when a user does not move, the measurement unit 130 may measure the frequency and amplitude of the auditory data. The measurement unit 130 may determine the movement of a source of the auditory data using the frequency and amplitude by the Doppler effect.

In embodiments of the present disclosure, the data output apparatus 100 first measures the frequency of the auditory data because it is unclear whether the auditory data has one meaning. For example, the data output apparatus 100 receives or inputs auditory data on a relatively short time basis such as 1 second, 0.5 second, or 0.2 second. Such short-term auditory data, that is, unit-size or unit-time auditory data, may have no meaning. Therefore, the data output apparatus 100 performs a process of measuring only the frequency of auditory data before extracting a text or a meaningful piece of data from the auditory data.

The search unit 140 may search the database 300 on the basis of the at least one frequency to find reference data oscillating at the at least one frequency. Here, the reference data may be data set or input by a user or manager. For example, the reference data may be set by a user or manager and may include auditory data that a user should not overlook, and examples of the reference data may include: a doorbell sound; a ringtone and a text message alert sound of a cellular phone; a route guide sound, a speed limit alert, a school zone alter, a speed bump alert, an accident black spot alert of a navigation device; and "excuse me," "help me," "hold on," "here," "there," and "just a moment" said by a surrounding person. In addition, the reference data may include auditory data that may not be interpreted into language. For example, the reference data may include an infant's crying sound which is an infant's expression of emotion but cannot be directly translated into language, and an animal's crying sound which is an animal's expression of emotion but cannot be directly translated into language. Here, the term "manager" may be used to refer to a person developing modules relating to the data output apparatus 100 or the database 300 or managing the modules. However, the term "manager" is not limited thereto. For example, a manager may be a normal user. The term "manager" is used for distinguishment from a user, that is, a user of the data output apparatus 100.

In some selective embodiments, the spectrum analysis unit 150 may compare the entirety or a portion of a first spectrum of the auditory data with the entirety or a portion of a second spectrum of the reference data, and may determine whether the similarity between the entireties or portions of the first and second spectrums is equal to or greater than a preset similarity degree. The spectrum analysis unit 150 may compare at least one piece of auditory data received through the first reception unit 110 with the reference data. The spectrum analysis unit 150 may determine, based on results of frequency analysis, the number of pieces of auditory data to be compared with the reference data. For example, when the continuation time of the reference data is 10 seconds, the data output apparatus 100 according to embodiments of the present disclosure may combine consecutively received pieces of auditory data with each other such that the continuation time of the combined pieces of auditory data may be greater than the continuation time of the reference data, and may then perform a spectrum analysis. Unit-time auditory data may have a period of time somewhat less than the time of the reference data, and thus the spectrum analysis unit 150 may combine pieces of auditory data according to the time of the reference data and may compare the combined pieces of auditory data with the reference data to increase the accuracy of comparison results. At this time, a piece of auditory data may be combined with the previous or next piece of auditory data.

In addition to analyzing the spectrum of auditory data, the spectrum analysis unit 150 may connect received pieces of auditory data such that the auditory data may be meaningful.

In this manner, the data output apparatus 100 according to embodiments of the present disclosure may check whether received auditory data match the stored reference data. That is, specifically, the data output apparatus 100 may search for reference data that match received auditory data.

The output data generation unit 160 may search for reference data by using only results of frequency analysis and may generate semantic data and/or guide data corresponding to the reference data as output data. In addition, the output data generation unit 160 may generate output data corresponding to the movement (position, velocity, movement path, or the like) of a source that generates auditory data corresponding to the reference data.

If the similarity between the first and second spectrums is equal to or greater than the present similarity degree, the output data generation unit 160 may generate semantic data and/or guide data corresponding to the reference data as output data.

If the first spectrum of the detected auditory data and the second spectrum of the reference data are consistent with each other, the output data generation unit 160 may generate output data to transmit auditory data and/or guide data corresponding to the reference data via the sense of touch, sight, smell, or taste of a user.

For example, if auditory data corresponding to route guidance of a navigation device, the output data generation unit 160 may generate output data for transmitting semantic data such as "turn to the left after 300 meters," "watch out for the speed bump," "the speed limit is 60 km/h in this zone," or "this is a school zone, slow down." which is a text included in the auditory data. The output data may deliver the same text as the semantic data or may deliver at least one of touch, sight, smell, and taste corresponding to the semantic data.

In this manner, the data output apparatus 100 according to embodiments of the present disclosure may deliver information generated by the navigation device to a user instead of hearing a sound generated by the navigation device. In addition, the data output apparatus 100 may inform a user of drive guidance who is concentrating on other sounds (music, a phone call, or the like) or driving.

For example, when frequency measurement and spectrum analysis are performed on detected auditory data corresponding to words spoken by a human, if it is impossible to search for reference data consistent with the detected auditory data in frequency and spectrum, the output data generation unit 160 may recognize the words included in the auditory data by a voice recognition method to extract a text and may generate the extracted text as semantic data. The output data generation unit 160 may generate semantic data corresponding to auditory data which is generated by a person around a user but is not recognized by the sense of hearing. For example, when auditory data such as "excuse me," "help me," "hold on," "here," "there," or "just a moment" is detected, the output data generation unit 160 may generate output data for transmitting a text extracted from the auditory data via the sense of touch, sight, smell, or taste.

For example, if auditory data, such as a sound generated by a human but is not directly construed, a sound generated by an object incapable of expressing any opinion, or a crying sound of an infant, is detected, the output data generation unit 160 may extract emotions included in the auditory data as semantic data after measuring the frequency of the auditory data and analyzing the spectrum of the auditory data and may output the semantic data as output data. At this time, the output data generation unit 160 may extract one of "hunger," "sleepiness," "boring," "indigestion," "diaper wetting," and "desire to play" from the crying sound of the infant as semantic data, and may output the semantic data as output data.

If auditory data is detected from an electronic device placed around a user, the output data generation unit 160 may generate, as output data, semantic data and/or guide data corresponding to reference data consistent with the auditory data. For example, if auditory data corresponding to a ringtone stored by a user is detected, the output data generation unit 160 may generate semantic data "call reception" corresponding to the ringtone as output data. For example, if auditory data corresponding to a doorbell chime stored by a user is detected, the output data generation unit 160 may generate semantic data "visitor" corresponding to the doorbell chime as output data. If a fire alert sound is detected, the output data generation unit 160 may generate semantic data "fire" corresponding to the fire alert sound as output data. Such a doorbell sound or ringtone may be previously individually set by a user.

The output unit 170 generates an output control signal to transmit the output data via the sense of touch, smell, sight, or taste of a user, and outputs data according to the output control signal. Although it is difficult to deliver a specific text via the sense of smell or taste sense, semantic data and/or guide data may be delivered using a pattern set according to the text. The output unit 170 may use a vibration device or a display device to transmit data via the sense of touch. In addition, the vibration device may be operated to express Braille.

In other embodiments, the data output apparatus 100 may detect and collect actions occurring around a user by using the second apparatus 202 capable of recognizing or detecting sensing data other than auditory data. To detect an action, the data output apparatus 100 according to embodiments of the present disclosure may further include a second reception unit 111, an extraction unit 180, an action detection unit 190. In particular, the data output apparatus 100 may sense the movement (position, velocity, movement path, or the like) of a source generating auditory data by using various types of sensing data.

The second reception unit 111 receives at least one piece of sensing data from the second apparatus 202. The second reception unit 111 may receive data relating to a user or surroundings of the user from the second apparatus 202. Here, the data relating to a user or surroundings of the user may be data (position, behavior, state variations, or the like) relating to surroundings of the user, or information about the existence of a source generating auditory data and the movement of the source. In addition, the second reception unit 111 may receive sensing values sensed by at least one sensor of the second apparatus 202. If a proximity sensor of the second apparatus 202 detects an approaching object, the second reception unit 111 may receive data about the approach of the object. In addition, if a gas sensor of the second apparatus 202 detects a significant increase of a certain gas concentration, the second reception unit 111 may receive data corresponding to the significant increase of the gas concentration. In addition, if a sound input sensor of the second apparatus 202 detects a sound, a movement, or an object having a magnitude or velocity equal to or greater than a preset critical value, the second reception unit 111 may receive data corresponding to the sound, movement, or object.

The extraction unit 180 may extract at least one source signal included in data received from the second apparatus 202. Here, the source signal refers to a different-type signal included in data generated by the second apparatus 202. According to data generated by the second apparatus 202, the source signal may correspond to an image signal, a temperature sensing value, a humidity sensing value, an acceleration value, a position value, a gas concentration, or the like.

The action detection unit 190 may analyze the at least one source signal to detect a first action included in the at least one source signal. The action detection unit 190 may sort one or more source signals according to the types of the source signals and may select a method of analyzing the source signals by considering the types of the source signals.

The action detection unit 190 may detect an object approaching a user by using the at least one source signal and may detect a first action corresponding to the movement of the object. The action detection unit 190 may analyze an image signal included in the at least one source signal using an image analysis algorithm to extract an object included in the image signal and detect an approaching movement of the object as a first action. The action detection unit 190 may detect a first action corresponding to an approaching object by receiving a sensing value acquired using a proximity sensor. For example, the action detection unit 190 may detect a movement of an approaching automobile, human, object, or the like as a first action. In this manner, an event that a user has not yet recognized but may be dangerous for the user may be detected as an action by the action detection unit 190.

The action detection unit 190 may detect an object moving at a velocity equal to or greater than a preset critical velocity from the at least one source signal and may detect a movement of the object moving at a velocity equal to or greater than the preset critical velocity as a first action.

The action detection unit 190 may extract a sensing value included in the at least one source signal according to the type of the at least one source signal, and if the type-relevant sensing value is markedly varied from a type-relevant sensing value included in at least one previously-obtained source signal, that is, varied to an extent equal to or greater than a preset critical value, the action detection unit 190 may detect the variation in the sensing value as a first action. For example, the action detection unit 190 may detect a first action when a sensing value corresponding to temperature, humidity, gas, or the like is markedly varied. A significant variation in a sensing value corresponding to temperature, humidity, gas, or the like may indicate a significant variation in the surrounding environment and may be hazardous to a user (for example, fires, volcanic eruptions, or natural disasters).

In this case, the output data generation unit 160 may generate output data corresponding to the action. In particular, although it is possible to exclusively output a detected action as output data, the detected action may be interactively combined with semantic data obtained from auditory data and may be output as output data. The output data generation unit 160 may generate output data corresponding to an action, interactively with semantic data and/or guide data from the first apparatus 201. For example, when semantic data obtained from detected auditory data indicates "turn to the right after 300 meters," and an action of approaching from the right at a velocity equal to or greater than a critical velocity is detected, output data corresponding to "be careful of a vehicle approaching from the right when turning to the right," or "slow down and wait before turning to the right." May be generated by considering the action. In addition, the output data generation unit 160 may exclusively generate output data corresponding to an action without interaction with semantic data and/or guide data received from the first apparatus 201. If an action in which an ambulance is approaching is detected, semantic data indicating the approach of the ambulance and/or guide data recommending making way for the ambulance may be generated as output data by the output data generation unit 160.

In this manner, the data output apparatus 100 according to embodiments of the present disclosure may generate output data for a user by using various types of sensing data in addition to auditory data.

In some selective embodiments, when a user does not move, the data output apparatus 100 may calculate the movement of source generating auditory data from the auditory data by using the Doppler effect. The data output apparatus 100 may measure the frequency of detected auditory data and determine a movement of a source generating the auditory data by considering the measured frequency. When using the Doppler effect, the movement of the source generating the auditory data may be one of an approaching movement and a receding movement.

Figure 3:
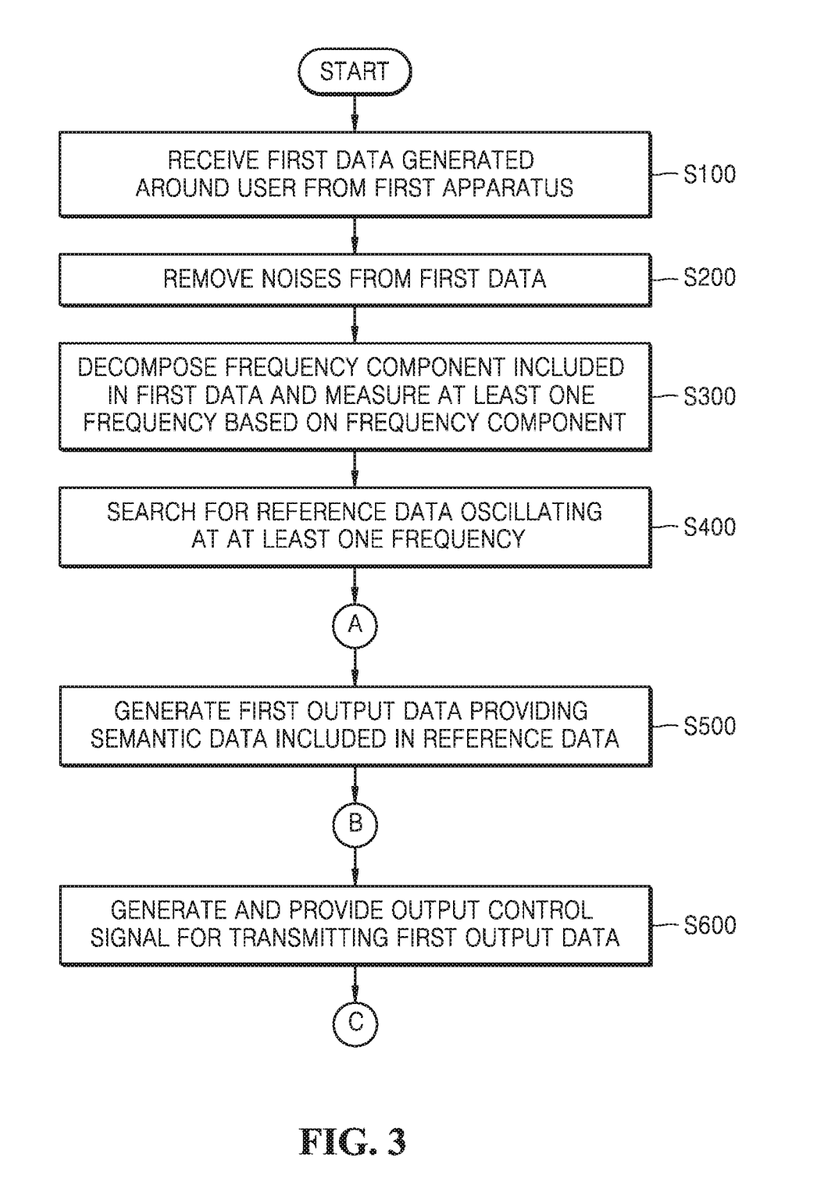
FIGS. 3 to 5 are flowcharts illustrating a data output method according to embodiments of the present disclosure.
Figure 4:
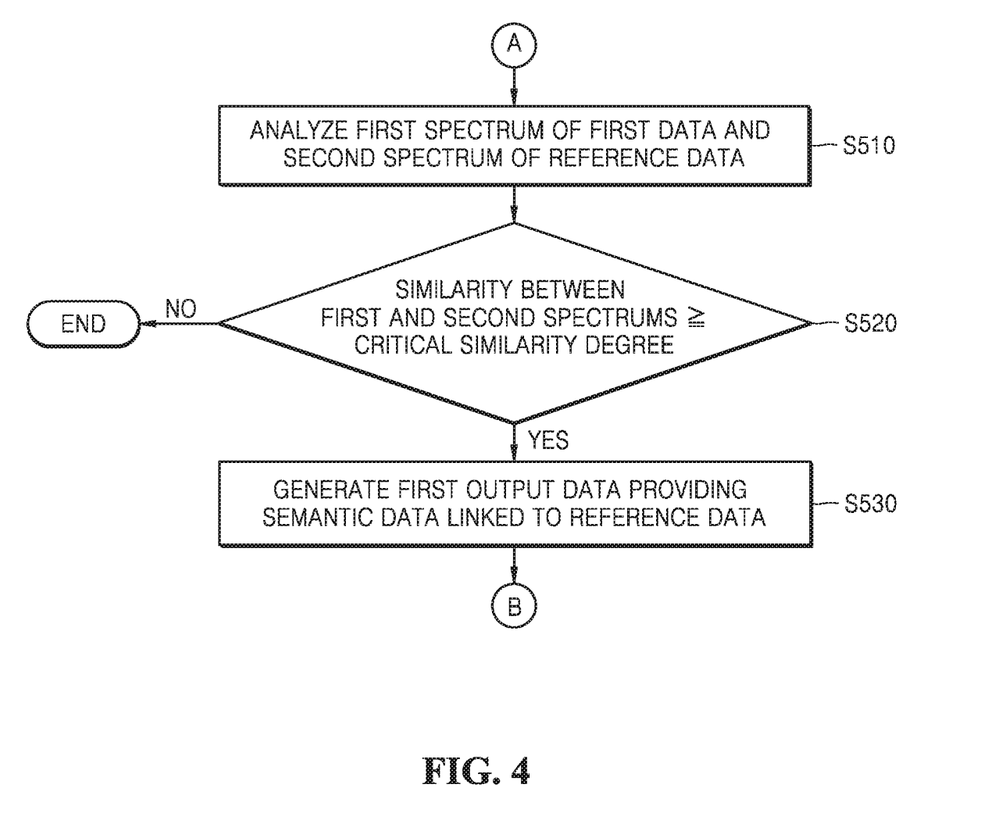
Figure 5:
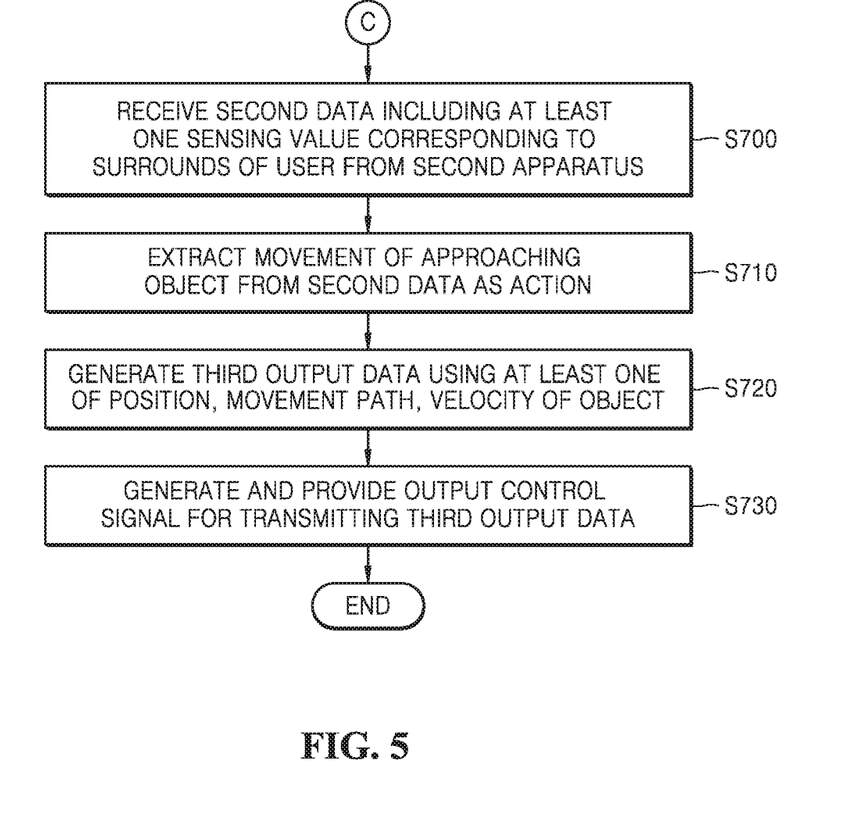

FIGS. 3 to 5 are flowcharts illustrating a data output method according to embodiments of the present disclosure.

Referring to FIG. 3, according to an embodiment of the present disclosure, the data output method may include: a process S100 of receiving first data occurring around a user from the first apparatus 201; a process S200 of removing noises from the first data; a process S300 of decomposing a frequency component included in the first data and measuring at least one frequency on the basis of the frequency component; a process S400 of searching for reference data oscillating at the at least one frequency; a process S500 of generating first output data providing semantic data included in the reference data; and a process S600 of generating an output control signal for transmitting the first output data.

In the process S100, the first reception unit 110 may receive first data generated from a surrounding electronic device, an object, a human, an animal, or the like.

In the process S200, the filter unit 120 removes noises from the first data. In more detail, after the filter unit 120 amplifies the first data, the filter unit 120 may determine a portion of the first data not included in a particular frequency band as noises and may remove the noises using a band-pass filter. In addition, the filter unit 120 may extract a section of the first data that may be recognized as a text.

In the process S300, the measurement unit 130 may decompose a frequency component included in the first data after noises are removed from the first data. The measurement unit 130 may measure at least one frequency included in the first data using the frequency component of the first data. The first data may have one frequency or a plurality of frequencies, and in general, sound has a plurality of frequencies.

In the process S400, the search unit 140 may search the database 300 on the basis of the at least one frequency to find reference data oscillating at the at least one frequency. Here, the reference data may be data set or input by the user or a manager. For example, the reference data may be set by the user or manager and may include auditory data that the user should not overlook, and examples of the reference data may include: a doorbell sound; a ringtone and a text message alert sound of a cellular phone; a route guide sound, a speed limit alert, a school zone alter, a speed bump alert, an accident black spot alert of a navigation device; and "excuse me," "help me," "hold on," "here," "there," and "just a moment" said by a surrounding person. In addition, the reference data may include auditory data that may not be interpreted into language. For example, the reference data may include an infant's crying sound which is an infant's expression of emotion but cannot be directly translated into language, and an animal's crying sound which is an animal's expression of emotion but cannot be directly translated into language.

In the process S500, the output data generation unit 160 may search for reference data by using only results of the frequency analysis and may generate semantic data and/or guide data corresponding to the reference data as output data. In addition, the output data generation unit 160 may extract a text included in the first data by analyzing the first data and may intactly output the test as output data.

In the process S600, the data output apparatus 100 may generate and provide an output control signal corresponding to the output data by considering the type of the output data.

Referring to FIG. 4, the process S500 of generating output data may specifically include spectrum analysis processes S510 and S520 and an output data generating process S530.

In the process S510, the data output apparatus 100 may extract a first spectrum of the first data and a second spectrum of the reference data by performing a spectrum analysis on the first data and the reference data. In the process S520, the data output apparatus 100 may determine whether the similarity between the first spectrum and the second spectrum is equal to or greater than a critical similarity degree. In the process S530, the data output apparatus 100 may generate first output data providing semantic data linked to the reference data. Here, the semantic data linked to the reference data may be, or may not be consistent with a text (language) included in the reference data. For example, if the first data does not include language, semantic data set by the user is output as output data corresponding to the first data.

Referring to FIG. 5, the data output method may include a process S700 of receiving second data including a sensing value, a process S710 of detecting an action, a process S720 of generating output data, and a process S730 of generating an output control signal.

In the process S700, the data output apparatus 100 receives at least one piece of sensing data from the second apparatus 202. The data output apparatus 100 may receive data relating to the user or surroundings of the user from the second apparatus 202. The data output apparatus 100 may receive data relating to a source generating auditory data from the second apparatus 202.

In the process S710, the data output apparatus 100 may extract at least one source signal included in the data received from the second apparatus 202. Here, the source signal refers to various types of signals included in the data generated by the second apparatus 202. According to the data generated by the second apparatus 202, the source signal may correspond to an image signal, a temperature sensing value, a humidity sensing value, an acceleration value, a position value, a gas concentration, or the like. The action detection unit 190 may detect an object approaching the user by using the at least one source signal and may detect a first action corresponding to the movement of the object. The data output apparatus 100 may analyze an image signal included in the at least one source signal using an image analysis algorithm to extract the source generating auditory data included in the image signal and may detect a movement (position, velocity, movement path, or the like) of the source.

The action detection unit 190 may analyze the image signal included in the at least one source signal using an image analysis algorithm to extract an object included in the image signal and detect an approaching movement of the object as a first action. The action detection unit 190 may analyze the at least one source signal to detect the first action included in the at least one source signal. The action detection unit 190 may detect an object moving at a velocity equal to or greater than a preset critical velocity from the at least one source signal and may detect a movement of the object moving at a velocity equal to or greater than the preset critical velocity as the first action. The action detection unit 190 may extract a sensing value included in the at least one source signal according to the type of the at least one source signal, and if the type-relevant sensing value is markedly varied from a type-relevant sensing value included in at least one previously-obtained source signal, that is, varied to an extent equal to or greater than a preset critical value, the action detection unit 190 may detect the variation in the sensing value as the first action.

In the process S720, the output data generation unit 160 may generate output data corresponding to the action. In particular, although it is possible to exclusively output the detected action as output data, the detected action may be interactively combined with semantic data obtained from the auditory data and may be output as the output data. The output data generation unit 160 may generate output data corresponding to the action, interactively with semantic data and/or guide data obtained from the first apparatus 201. The output data generation unit 160 may generate output data in response to an action corresponding to a movement of an approaching object by considering the approaching direction and velocity of the object. The output data generation unit 160 may generate output data to output a stimulation or a signal at a position corresponding to the approaching direction of the object, the stimulation or signal having a magnitude corresponding to the approaching velocity of the object. The output data generation unit 160 may generate output data in response to an action corresponding to a movement of an object moving at a velocity equal to or greater than a preset critical velocity by considering the movement direction and velocity of the object. By considering the type and variation of the detected sensing value, the output data generation unit 160 may generate output data to output a stimulation or a signal at a position corresponding to the type of the sensing value, the stimulation or signal having a magnitude corresponds to the variation of the sensing value.

In some selective embodiments, the output data generation unit 160 may generate output data corresponding to the movement (position, velocity, movement path, or the like) of a source that generates auditory data.

In the process S730, the output data may be converted into an output control signal that the data output apparatus 100 may output. If the data output apparatus 100 is configured to output information by means of vibration, the data output apparatus 100 may generate the output control signal such that a vibration corresponding to the output data may be generated. If the data output apparatus 100 is configured to output information via nerves or cells, the data output apparatus 100 may generate the output control signal such that stimulation, a sense, or the like corresponding to the output data may be generated. The data output apparatus 100 may generate an output control signal that may be directly transmitted to the brain nerves or cells of the user or an output control signal that may be directly transmitted to nerves or cells relating to other senses. The kind, type, or format of the output control signal generated by the data output apparatus 100 may vary according to the type, method, or algorithm of transmission.

FIGS. 6 to 8B are views illustrating operations of the data output apparatus.

Figure 6:
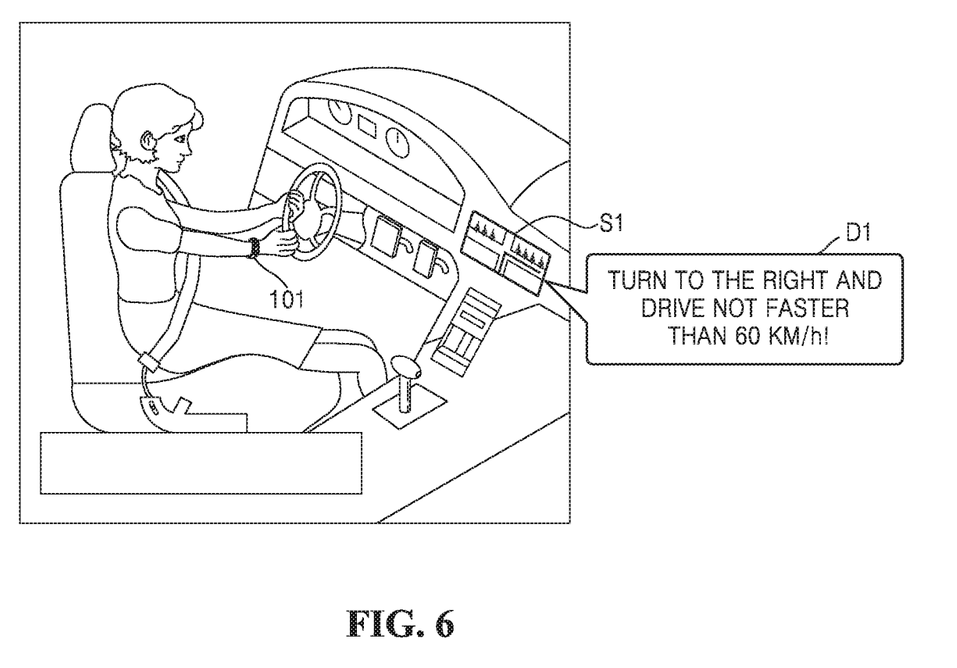

FIG. 6 is a view illustrating an example of detecting auditory data from a navigation device around a user. As shown in FIG. 6, a user collects data relating to directions from images (visual data) and sounds (auditory data) generated by a display unit of a navigation device S1.

Although the user may drive with the aid of image data, if auditory data from the navigation device S1 are not detected or recognized, the user may pass by a preferable road. According to embodiments of the present disclosure, the data output apparatus 100 may generate and provide output data corresponding to auditory data such as "turn to the right and drive not faster than 60 km (D1)" generated by the navigation device S1, thereby preventing a troublesome action of looking at the navigation device S1 to check information during driving and guaranteeing natural and safe driving. A data output apparatus 101 may be attached to the wrist of the user and may transmit output data via the sense of touch of the user.

Figure 7A:
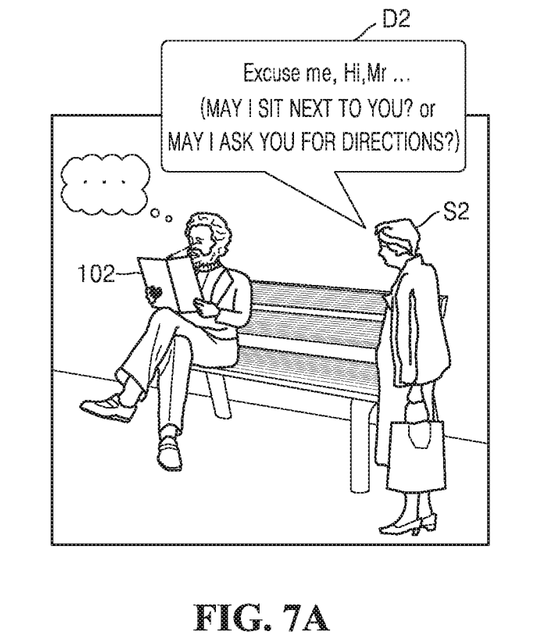
Figure 7B:
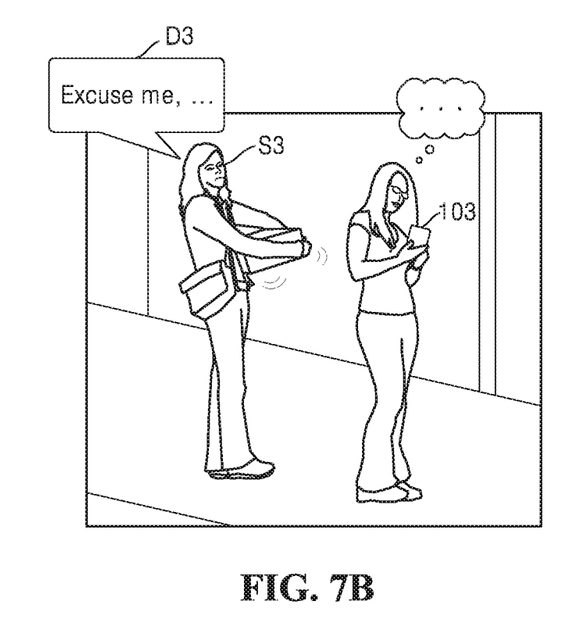

FIGS. 7A and 7B are views illustrating examples of detecting and outputting auditory data generated by another user.

As shown in FIG. 7A, a user may detect auditory data D2 (such as "Excuse me," "Hi," "Mr," or any words for asking directions) generated by another user S2 by using a data output apparatus 102 such as a tablet PC, and may visually transmit semantic data and/or guide data corresponding to the auditory data through the data output apparatus 102.

As shown in FIG. 7B, a user may detect auditory data D3 (such as "Excuse me") generated by another user S3 by using a data output apparatus 103 such as a cellar phone, and may transmit semantic data and/or guide data corresponding to the auditory data through the data output apparatus 103 by means of a touch, smell, or sight sense.

Figure 8A:
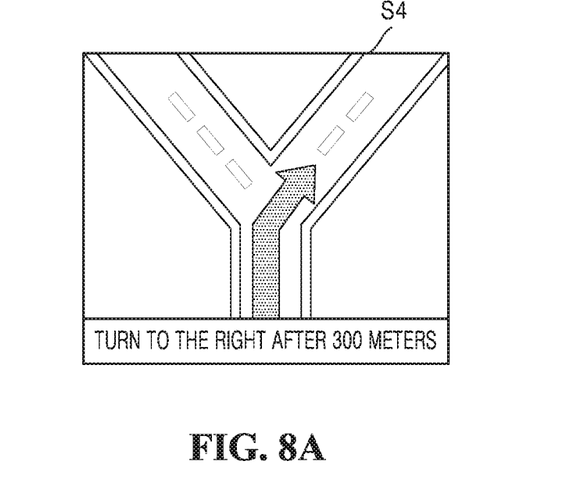
Figure 8B:
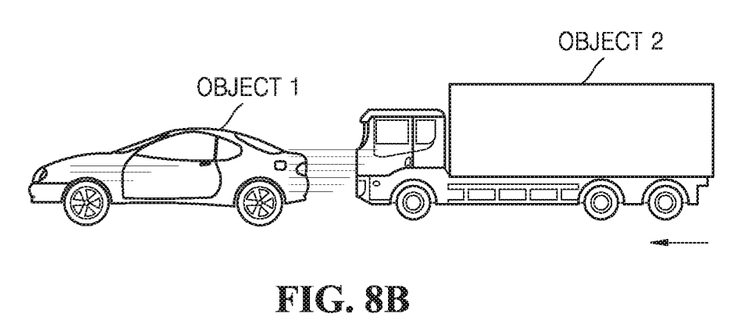

FIGS. 8A and 8B are views illustrating an embodiment in which output data are generated using auditory data and sensing data obtained through the first apparatus 201 and the second apparatus 202.

As shown in FIG. 8A, if auditory data "turn to the right after 300 meters" is detected from a navigation device, and an action corresponding to a second object OBJECT 2 approaching the right side of a first object OBJECT 1 corresponding to a user at a velocity equal to or greater than a critical velocity is detected, output data may be generated by considering the auditory data and the action. Output data such as "Be careful of a second object OBJECT 2 on the right side" may be generated in accordance with the auditory data.

The above-described embodiments of the present disclosure may be implemented in the form of computer programs executable on a computer using various components, and such computer programs may be stored in computer readable media. Examples of the computer readable media may include: magnetic media such as hard disks, floppy disks, and magnetic tapes; optical recording media such as CD-ROMs and DVDs; magneto-optical media such as floptical disks; and hardware such as ROMs, RAMs, and flash memories specifically configured to store program instructions and execute the program instructions. In addition, examples of the computer readable media may include intangible media that can be transferred over a network. For example, the computer readable media may be implemented in the form of software or applications that can also be transferred and distributed over a network.

In addition, the computer programs may be those designed and configured according to the embodiments of the present disclosure or well known in the computer software industry. Examples of the computer programs may include machine codes made by compilers and high-level language codes executable on computers using interpreters.

In addition, the above-described operations or embodiments are examples which are not intended to limit the scope and spirit of the present disclosure. In the present disclosure, descriptions of known electronic components, control systems, software, and other functional aspects thereof may not given for conciseness. Furthermore, in the drawings, connection lines or members between elements are exemplary functional, physical, and/or electrical connections that can be replaced with or used together with other functional, physical, and/or electrical connections. Elements described without using terms such as "essential" and "important" may not be necessary for constituting the inventive concept.

The singular forms "a," "an" and "the" in this present disclosure (in particular, claims) may be intended to include the plural forms as well. In addition, unless otherwise defined, the ranges defined herein are intended to include any embodiments to which values within the range are individually applied and may be considered to be the same as individual values constituting the ranges in the detailed description of the present disclosure. Finally, processes constituting the method of the present disclosure may be performed in appropriate order unless explicitly described in terms of order or described to the contrary. The inventive concept is not necessarily limited to the order of processes given in the description. The examples or exemplary terms (for example, etc.) used in the present disclosure are to merely describe exemplary embodiments in detail and not intended to limit the scope and spirit of the present disclosure unless defined by the following claims. Also, those skilled in the art will readily appreciate that many alternations, combinations, and modifications may be made according to design conditions and factors within the scope of the appended claims and their equivalents.

INDUSTRIAL APPLICABILITY

The present disclosure relates to a data output apparatus, a data output method, and a computer-readable recording medium, and more particularly, to a data output apparatus, a data output method, and a computer-readable recording medium that are for acoustically receiving information about a user and sensorially transmitting data corresponding to the information to the user.

The invention claimed is:

1. A data output method comprising:
receiving, by a data output apparatus, unit-time or unit-size auditory data which are generated around a user and detected via a first apparatus;
removing noises from the auditory data;
extracting a frequency component included in the auditory data from which the noises have been removed;
measuring at least one frequency of the auditory data on the basis of the frequency component;
searching a database on the basis of the at least one frequency to find reference data oscillating at the at least one frequency;
generating first output data providing semantic data included in the reference data; and
generating and providing an output control signal for transmitting the first output data,
wherein after the generating of the first output data, the method further comprises generating second output data providing guide data linked to the reference data, and providing the output control signal after modifying the output control signal to additionally transmit the second output data.

2. The data output method of claim 1, wherein before the generating of the first output data, the data output method further comprises comparing a first spectrum of the auditory data with a second spectrum of the reference data to determine whether the first and second spectrums are similar to each other to an extent equal to or greater than a preset similarity degree,
wherein only when the first and second spectrums are similar to each other to an extent equal to or greater than the preset similarity degree, the first output data providing the semantic data included in the reference data is generated.

3. The data output method of claim 1, wherein the auditory data detected via the first apparatus are data generated by at least one of an electronic device, a human, an object, and an animal around the user.

4. The data output method of claim 1, wherein the semantic data comprise a text extracted from the auditory data or at least one of emotions extracted from the auditory data.

5. The data output method of claim 1, wherein the guide data correspond to a follow-up reaction that the user makes when recognizing the auditory data.

6. The data output method of claim 1, further comprising:
receiving at least one piece of sensing data via a second apparatus different from the first apparatus;
detecting an action included in the sensing data by analyzing the sensing data; and
additionally generating third output data corresponding to the action.

7. The data output method of claim 6, wherein in the detecting of the action, an action corresponding to a movement of an object moving or approaching at a velocity equal to or greater than a preset critical velocity is detected from the sensing data, and
in the additionally generating of the third output data, the third output data is generated to generate a stimulation at a position corresponding to a position of the object, the stimulation having a magnitude corresponding to the velocity of the object.

8. The data output method of claim 1, further comprising:
receiving at least one piece of sensing data via a second apparatus different from the first apparatus;
detecting a source generating the auditory data and a movement of the source by using the sensing data; and
additionally generating third output data corresponding to the movement of the source.

9. The data output method of claim 1, further comprising:
measuring a frequency and amplitude of the auditory data using the data output apparatus;
measuring a movement of a source generating the auditory data using the frequency and amplitude;
generating second output data corresponding to the movement of the source generating the auditory data; and
generating and providing an output control signal for transmitting the second output data.

10. A data output apparatus comprising:
a first reception unit configured to receive unit-time or unit-size auditory data which are generated around a user and detected by a first apparatus;
a filter unit configured to remove noises from the auditory data;
a measurement unit configured to extract a frequency component included in the auditory data from which the noises have been removed and measure at least one frequency of the auditory data on the basis of the frequency component;
a search unit configured to search a database on the basis of the at least one frequency to find reference data oscillating at the at least one frequency;
an output data generation unit configured to generate first output data providing semantic data included in the reference data; and
an output unit configured to generate and provide an output control signal for transmitting the first output data,
wherein after the first output data is generated, the output unit generates second output data providing guide data linked to the reference data, and provides the output control signal after modifying the output control signal to additionally transmit the second output data.

11. The data output apparatus of claim 10, further comprising a spectrum analysis unit configured to compare a first spectrum of the auditory data with a second spectrum of the reference data to determine whether the first and second spectrums are similar to each other to an extent equal to or greater than a preset similarity degree,
wherein only when the first and second spectrums are similar to each other to an extent equal to or greater than the preset similarity degree, the output data generation unit generates the first output data providing the semantic data included in the reference data.

12. A non-transitory computer readable recording medium storing a program for executing the data output method of claim 1.

\* \* \* \* \*